2,782,230

SULFONATION WITH SULFUR TRIOXIDE

William H. Seaton, Nitro, W. Va., assignor to Monsanto Chemical Company, St. Louis, Mo., a corporation of Delaware No Drawing. Application April 6, 1953, Serial No. 347,139

4 Claims. (Cl. 260—505)

This invention relates to improvements in sulfonation by means of sulfur trioxide. The invention is especially concerned with the preparation of surface active agents by the introduction of a water solubilizing sulfonate group. A surface active agent is loosely any substance which in small amounts markedly alters the surface behavior of a given system. These include, for example, water soluble substances which markedly lower the surface tension in aqueous solution. Thus, this invention is primarily concerned with improvements in the manufacture of wetting agents, detergents, emulsifiers and dispersants comprising high molecular weight organic substances solubilized by sulfonation.

In the process of sulfonation with sulfuric acid or oleum the reaction mixture contains a residue of sulfuric acid. Water is a by-product of the reaction so spent acid is inevitable. This spent acid is neutralized along with the sulfonated product when treated with a suitable base, usually sodium hydroxide. While the sodium sulfate by-product is desirable for some purposes, it is distinctly undesirable for others and must be removed. For example, when the use intended for the sulfonated product is in non-aqueous systems, the sodium sulfate must be removed. Sodium sulfate is insoluble in petroleum fractions and other organic solvents so that where the sulfonate is to be employed in oil or for the preparation of emulsifiable concentrates of pesticides, the material must be essentialy sulfate-free.

Use of sulfur trioxide for the sulfonation would be expected to overcome the difficulty since no water is formed and no residual acid would be expected. On the other hand, the neutralized products actually contain within the range of 2 to 5% sodium sulfate. This is readily demonstrated by treating the neutralized sulfonation product with alcohol and determining the proportion insoluble in alcohol. It appears that while the principal reaction involved is $RH + SO_3 = RSO_3H$ where $RH$ represents the organic molecule to be sulfonated, there is a certain proportion of sulfur trioxide combined in some other way. It has been suggested that the following reaction takes place to some extent:

$$RH + 2SO_3 = RSO_3.SO_3H$$

When the reaction mass containing this complex of sulfur trioxide is treated with caustic soda, the complex would be expected to yield one mole of sodium sulfate per mole of the complex. It will be understood, however, that this invention is not limited to any particular theory of how the formation of inorganic constituents arises.

Among the objects of the present invention are to reduce the inorganic salts formed in the neutralization of the crude sulfonation masses obtained by sulfonation with sulfur trioxide, to utilize more fully the sulfur trioxide for the preparation of useful products, to remove sulfur trioxide combined with the sulfonate, to prepare products suitable for the preparation of aqueous solutions or pastes of high sulfonate concentration, to prepare sulfonated products having low insoluble content in organic solvents and to provide a method of purification of the crude sulfonation mass. Other and further objects will in part be apparent and in part particularly pointed out in the detailed description following.

According to the present invention mercury is added to the crude sulfonation mass before neutralization of the sulfonic acid is complete. The mercury may be either in the form of elemental mercury or in the form of a mercury salt. Mercuric acetate, mercuric bromide, mercuric chloride, mercuric fluoride, mercuric iodide, mercuric nitrate, mercuric oxide, mercuric phosphate, mercuric sulfate, mercuric sulfocyanate, mercurous bromide, mercurous chloride, mercurous fluoride, mercurous oxide, mercurous sulfate and mercurous sulfide are apparently all suitable. The mercury may be added to the crude sulfonation mass immediately after completion of the sulfur trioxide reaction or the crude sulfonation mass may be partially neutralized but the mercury must be added before neutralization is complete. The reaction is greatly facilitated by heating. The amount required and the time of treatment are both reduced by stirring and heating with the mercury at about 60° C. For example the reduction of the inorganic salt content was the same with 0.5% of the mercury compound at 60° C. as it was with 1% of the same adjuvant at room temperature. If desired an organic solvent for the sulfonation mass may be employed but this introduces the hazard and expense of recovering the solvent and it has not been necessary in spite of the fact that the sulfonation mass is a thick viscous liquid.

The manner in which the mercury functions to reduce the inorganic salt content is unknown. While mercury and mercury compounds are known to catalyze sulfonation reactions, other sulfonation catalysts exhibited no noticeable effect. These included iodine, activated carbon, sodium sulfate and vanadium pentoxide with sodium sulfate.

The invention is particularly applicable to the sulfonation of aromatic compounds and more particularly to the sulfonation of alkyl aromatic hydrocarbons, as for example alkyl benzenes, alkyl diphenyls and alkyl napthhthalenes. Alkyl benzenes containing 10 to 15 carbon atoms in the side chain are utilized for the preparation of preferentially water soluble sulfonates whereas those containing 18 to 30 carbon atoms in the side chain are valuable for the preparation of preferentially oil soluble sulfonates. These intermediates include the well known keryl benzenes and alkyl benzenes derived from olefins. Polymers of ethylene, propylene, butylene and amylene are all useful for this purpose. For example, for the preparation of a preferentially oil soluble sulfonate alkyl benzene boiling at 220–500° F./5 mm. has been recommended. These alkyl benzenes can in turn be prepared by alkylation of benzene with butylene or propylene polymembers having boiling points initially of 230° F./5 mm. Alkyl benzenes which give preferentially water soluble sulfonates include alkyl benzene boiling at 250–338° C. at atmospheric pressure prepared from propylene tetramer, alkyl benzene fraction B. P. 109–165° C./2 mm. prepared from propylene tetramer, keryl benzene, B. P. 102–165° C./2 mm., and keryl benzene B. P. 35–165° C./2 mm.

The following detailed example illustrates the invention in detail but is to be understood as illustrative only.

A keryl benzene fraction corresponding essentially to dodecyl benzene was sulfonated by means of sulfur trioxide in a well known manner. 53.6 parts by weight of dodecyl benzene was charged into a sulfonator and 17.5 parts by weight of sulfur trioxide vapor diluted with 52.3 parts by weight of dry air was passed into the stirred mixture while keeping the temperature at 60–70° C. The crude sulfonation mass was then neutralized with 17.4 parts by weight of 50% sodium hydroxide diluted with 12.5 parts by weight of water to produce a composition comprising 75% sodium alkyl benzene sulfonate. Other runs were carried out by adding mercuric chloride to the crude sulfonation mass before neutralization and stirring for about an hour at 60° C. The acids were then neutralized as described, the mercury removed and the inorganic salt content determined by finding the proportion of sodium sulfonate insoluble in alcohol. Typical results are summarized below:

| Mercuric Chloride, Percent on crude Sulfonation Mass | Alcohol Insolubles, percent on Neutralized Reaction Product |
|---|---|
| None | 3.0 av. |
| 0.1 | 2.4 |
| 0.5 | 1.1 |

Another sulfonation was carried out as described above, the crude sulfonation mass divided and one-half neutralized without treatment with mercury and to the other half at room temperature was added 1% by weight of mercuric chloride and the mixture stirred for about an hour. Both fractions were then neutralized, the mercury removed from the one and the percent of inorganic salt determined. Without mercury treatment the alcohol insolubles were 4.3% whereas the portion treated with mercury had an insoluble content of only 1.7%.

It is intended to cover all changes and modifications of the examples of the invention herein chosen for purposes of disclosure which do not constitute departures from the spirit and scope of the invention:

What is claimed is:

1. In a process of producing a substantially inorganic salt-free organic sulfonate surface active agent by sulfonation of an alkylated aromatic hydrocarbon containing at least 10 carbon atoms in the side chain with sulfur trioxide and neutralizing the sulfonic acid so produced, the steps of adding a material of the group consisting of elemental mercury and mercury salts to the crude sulfonation mass after completing the sulfonation reaction without a catalyst but before neutralization of the sulfonic acid is complete, heating and stirring the mixture, and neutralizing the sulfonated material.

2. In a process of producing a substantially inorganic salt-free organic sulfonate surface active agent by sulfonating an alkyl benzene in which the side chain contains 10–15 carbon atoms with sulfur trioxide and neutralizing the sulfonic acid so produced, the steps of adding a member of the group consisting of elemental mercury and mercury salts to the crude sulfonation mass after completing the sulfonation reaction without a catalyst but before neutralization of the sulfonic acid is complete, heating and stirring the mixture, and neutralizing the sulfonated material.

3. In a process of producing a substantially inorganic salt-free organic sulfonate surface active agent by sulfonating an alkyl benzene in which the side chain contains 10–15 carbon atoms with sulfur trioxide and neutralizing the sulfonic acid so produced, the steps of adding a mercury salt to the crude sulfonation mass after completing the sulfonation reaction without a catalyst but before neutralization of the sulfonic acid is complete, heating and stirring the mixture, and neutralizing the sulfonated material.

4. In a process of producing a substantially inorganic salt-free organic sulfonate surface active agent by sulfonating an alkyl benzene in which the side chain contains 10–15 carbon atoms with sulfur trioxide and neutralizing the sulfonic acid so produced, the steps of adding mercuric chloride to the crude sulfonation mass after completing the sulfonation reaction without a catalyst but before neutralization of the sulfonic acid is complete, heating and stirring the mixture, and neutralizing the sulfonated material.

References Cited in the file of this patent
UNITED STATES PATENTS
2,493,038    Snyder et al. _____ Jan. 3, 1950

OTHER REFERENCES
Suter: Organic Chemistry of Sulfur, 1944, pp. 200–201.